Nov. 18, 1969   B. SEILER   3,478,912
CONTAINER
Filed Dec. 20, 1966
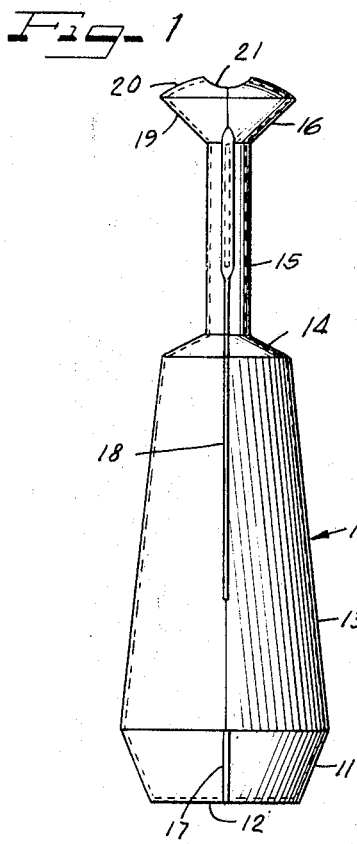
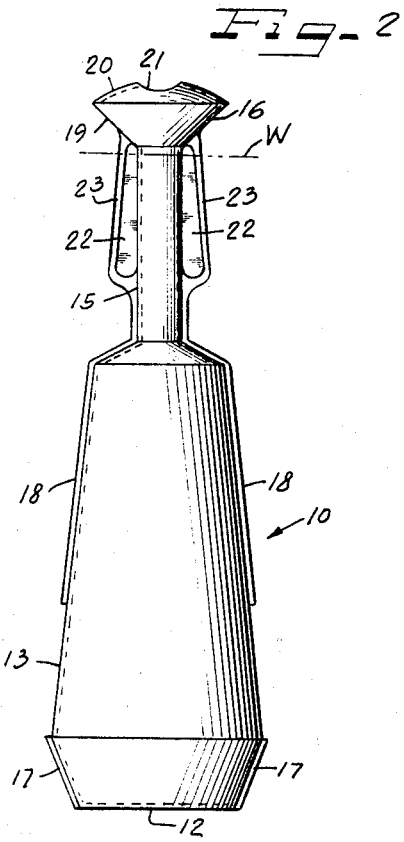
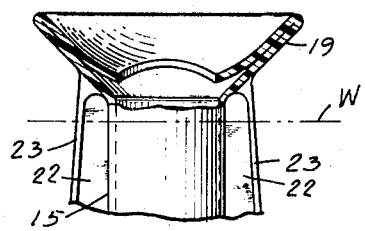
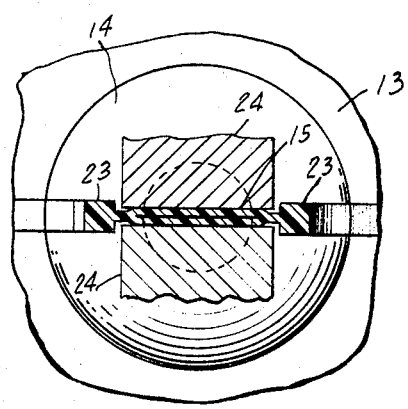
INVENTOR.
BERNHARD SEILER
BY
ATTORNEYS

United States Patent Office 3,478,912
Patented Nov. 18, 1969

3,478,912
CONTAINER
Bernhard Seiler, Zurich, Switzerland, assignor of one-half to Emil Hartmann, Zurich, Switzerland
Filed Dec. 20, 1966, Ser. No. 603,288
Claims priority, application Switzerland, Dec. 22, 1965, 17,723/65
Int. Cl. B65d 1/02, 47/02
U.S. Cl. 215—31                                    2 Claims

ABSTRACT OF THE DISCLOSURE

A plastic container having a body portion connected by a neck portion to a filling head which comprises a first funnel portion and a reversed funnel portion having an opening to the interior of the container. During the filling operation, the reverse funnel portion collapses into the first funnel portion to form a stiffened filling funnel for the container. The neck portion is provided with a pair of oppositely extending ribs which increase the rigidity of the container and which prevent welding dies from contacting each other as the neck portion is crimped and welded together to seal the container.

Background of the invention

*Field of the invention.*—The present invention relates to a container formed of plastic material which is particularly suited to being manufactured and sold with mass production techniques. More particularly, the invention resides in the provision of a plastic container which is designed to be formed in a mold with a container-filling funnel formed integrally therewith, which is adapted to be filled in an automatic filling machine through the funnel and which is thereafter adapted to be closed by a heat sealing method involving the use of cooperating dies serving to weld the container neck closed and which is designed to have the originally integrally formed filling spout cut off subsequently above the neck-sealing line.

Summary of the invention

Generally speaking, the invention is characterized by a container design wherein a filling head is provided on the container which has funnel and reverse funnel portions formed integrally with one another which are adapted to be pressed into juxtaposed relation with one another during a container-filling operation whereby to provide a stiffened filler-engaging funnel section which will seal itself against the filling head of a container-filling apparatus to facilitate filling the container with a desired substance. The invention is further characterized by the formation of the neck of the container immediately adjacent the filling head in such a manner as to facilitate the heat sealing type closure of the container neck while at the same time preventing undesired contact between the mating welding dies.

It is, therefore, a principal object of this invention to provide a plastic container which is uniquely adapted for mass production and mass filling techniques.

Another and more specific object of the invention resides in the provision of a plastic container having a filling head comprising integrally formed funnel and reverse funnel portions which are collapsible one upon the other to provide a rigidified and sealing filling funnel which will cooperate with the usual filling spout of a container-filling machine.

Yet another object of the invention resides in the provision of a plastic container wherein means are provided to facilitate closure of the container neck through a plastic welding operation and which is further designed to prevent undesired contact between the mating welding die parts.

These and other objects, features and advantages of the present invention will become apparent from time as the following specification proceeds and with reference to the accompanying drawings, wherein the figures hereafter briefly described will be found.

Brief description of the drawings

FIGURE 1 is a side elevational view of a plastic constructed in accordance with the principles of the present invention and which shows the interior of the side walls in broken lines for reference;

FIGURE 2 is a front elevational view of the container illustrated in FIGURE 1 with the inner surface of the container walls shown in broken lines;

FIGURE 3 is a fragmentary vertical sectional view of a portion of the container illustrated in the first two figures but with the reverse funnel portion collapsed on the lower funnel portion; and FIGURE 4 is a horizontal sectional view through a portion of the container shown in the other figures when the welding dies are used for the purpose of sealing the container neck.

Description of the preferred embodiment

The container illustrated could be used for a great many purposes such for instance as for containing bath water and has a container body 10 with an inwardly sloping bottom wall 11 and a base 12 and an elongated upwardly and inwardly sloping sidewall portion 13. The wall 13 converges through a shouldered portion 14 with the container neck 15 which neck has an integral filling head 16 formed at the upper end thereof.

Container stiffening ribs 17 are shown as being formed on opposite sides of the container along the converging bottom portion 11 and similar ribs 18 extend along the two opposed sides of the upwardly and inwardly converging container portion 13 and the shoulder 14 and thence vertically upwardly along two opposed sides of the neck 15.

The filling head 16 comprises a funnel 19 which diverges from the upper end of the cylindrical neck 15 and which has a convex reverse funnel portion 20 formed integrally therewith and converging to a filling aperture 21. The aperture 21 is aligned with the interior of the neck 15 and is adapted to receive the filling head of an automatic container filling machine. The container is made from a plastic material and is preferably vacuum formed from plastic tubular stock and has walls in its finished state which are very thin such for example on the order of 0.1 to 0.2 mm. thick.

To this end, the container is provided with the rigidifying ribs 17 and 18 already described. In addition, two elongated vertically extending ribs 22 are provided on either side of the container neck 15 and these ribs have their outer edges stiffened as at 23, the stiffened portions 23 constituting in fact, extensions of the ribs 18.

A container constructed in the manner illustrated in FIGURES 1 and 2 is filled in the following manner: The filling head of an automatic filling machine is moved into engagement with the convex reverse funnel portion 20 of the filling head 16 and the reverse funnel portion 20 is pressed inwardly until it collapses against the inner surface of the funnel portion 19 in the manner illustrated in FIGURE 3 and, in this collapsing, a firm elastic sealing funnel is provided which presses against the filling head of an automatic filling machine to insure positive leak-free filling of the container. Generally, fluid is introduced into the container by means of a hollow pin which may depend from the filling head of the filling machine through the aperture 21 downwardly into the neck 15 and both excess air and excess liquid around the hollow pin flow back into the filling apparatus through this pin without overflowing the container. Such leak-free filling is augmented through the novel design of the filling head 16 herein disclosed.

After filling the container, the neck 15 is sealed and the container is thereby closed by plastic welding the neck 15 approximately along the welding line W illustrated in FIGURES 2 and 3 and then the portion of the container including the filling head 16 lying above that welding line W is cut off so that the upper portion of the completed container terminates at the line W. FIGURE 4 illustrates the welding operation wherein mating welding dies 24 are moved toward one another to seal together the inner walls of the container neck 15 along the welding line W shown in FIGURES 2 and 3. It will here be observed that the ribs 22 serve the very useful purpose of preventing the welding dies 24 from actually contacting one another during this sealing operation. It is, of course, necessary that the width of the welding dies 24 be somewhat greater than the width of the container neck 15 for all practical purposes and that the ribs 22 extend outwardly in such a manner as to prevent this die contact so that the generation of sparks or the presence of impurities along the faces of the welding dies will not interfere with the welding operation. In addition, the ribs 22 and their associated thickened outer edge portions 23 cooperate to assure a dependable keeping of the welding seam.

This embodiment of my invention has been used for illustrative puropses only and it will be understood that other modifications and variations in the invention may be effected without departing from the spirit and scope of the novel concepts thereof.

I claim as my invention:

1. A plastic container comprising a container body having a filling head opening to the interior of said container, said filling head including a funnel portion converging to the container body, and an integral formed reversed funnel portion converging from the outermost edge of the first mentioned funnel portion to a filling aperture, said reverse funnel portion being adapted to be collapsed on said first mentioned funnel portion with said aperture opening into the interior of said container for providing a stiffened filling funnel for the container, and a single pair of opposed ribs extending along said container body at right angles to a desired welding line, wherein container closure is effected by welding opposed walls of the container together.

2. A plastic container comprising a container body having a filling head opening to the interior of said container, said filling head including a funnel portion converging to the container body, and an integral formed reversed funnel portion converging from the outermost edge of the first mentioned funnel portion to a filling aperture where the reversed funnel portion is of less length than the converging funnel portion, said reverse funnel portion being adapted to be collapsed on said first mentioned funnel portion with said aperture opening into the interior of said container for providing a stiffened filling funnel for the container for substantially the entire length of said funnel portion.

References Cited

UNITED STATES PATENTS 3,356,244   12/1967   Witchell _____ 215—32

FOREIGN PATENTS 606,004   6/1960   Italy.
556,274   4/1957   Belgium.
1,032,835   4/1953   France.
1,005,781   9/1965   Great Britain.

DONALD F. NORTON, Primary Examiner

U.S. Cl. X.R.

215—1